Jan. 12, 1971 M. DUMAIRE 3,555,425

SYNCHRONIZATION APPARATUS FOR TWO-WAY SYNCHRONOUS CODED LINK

Filed May 16, 1967 3 Sheets-Sheet 1

3,555,425
SYNCHRONIZATION APPARATUS FOR TWO-WAY SYNCHRONOUS CODED LINK

Marc Dumaire, Paris, France, assignor to CSF-Compagnie Generale de Telegraphie Sans Fil, a corporation of France Filed May 16, 1967, Ser. No. 638,864
Claims priority, application France, June 3, 1966, 64,145
Int. Cl. H04l 7/00
U.S. Cl. 325—58 3 Claims

ABSTRACT OF THE DISCLOSURE

A transmitter and receiver station for a two-way synchronous coded link are provided. It comprises a key generator connected to a decoding and coding arrangement. A first clock controls the key generator with a predetermined phase value during the reception and a second clock controls the key generator with another predetermind phase value during the transmission. First means are provided, when the station switches from transmission to reception, for stopping the key generator, which was in synchronism with the first clock, during the time necessary for bringing it in phase with the second clock; second means are provided for accelerating, when the station switches from reception to transmission, the key generator, which was in phase with said second clock, during the time necessary for bringing it in phase with said first clock.

The present invention relates to coded transmission links and more particularly to a two-way, synchronous link arrangement.

According to the present invention, there is provided a transmitter and receiver station for a two-way synchronous coded link comprising: a coding and decoding arrangement including a key generator, a first clock with a predetermined phase having a first output for controlling the coding action of said coding and decoding arrangement during the transmission; a second clock, with another predetermined phase and the same frequency as said first clock, having a second output for controlling the decoding action of said coding and decoding arrangement during reception; and switching means for alternately selectively switching said first and said second outputs to said coding and decoding arrangement.

For a better understanding of the invention reference will be made to the drawing accompanying the following description and in which.

Figure 1:
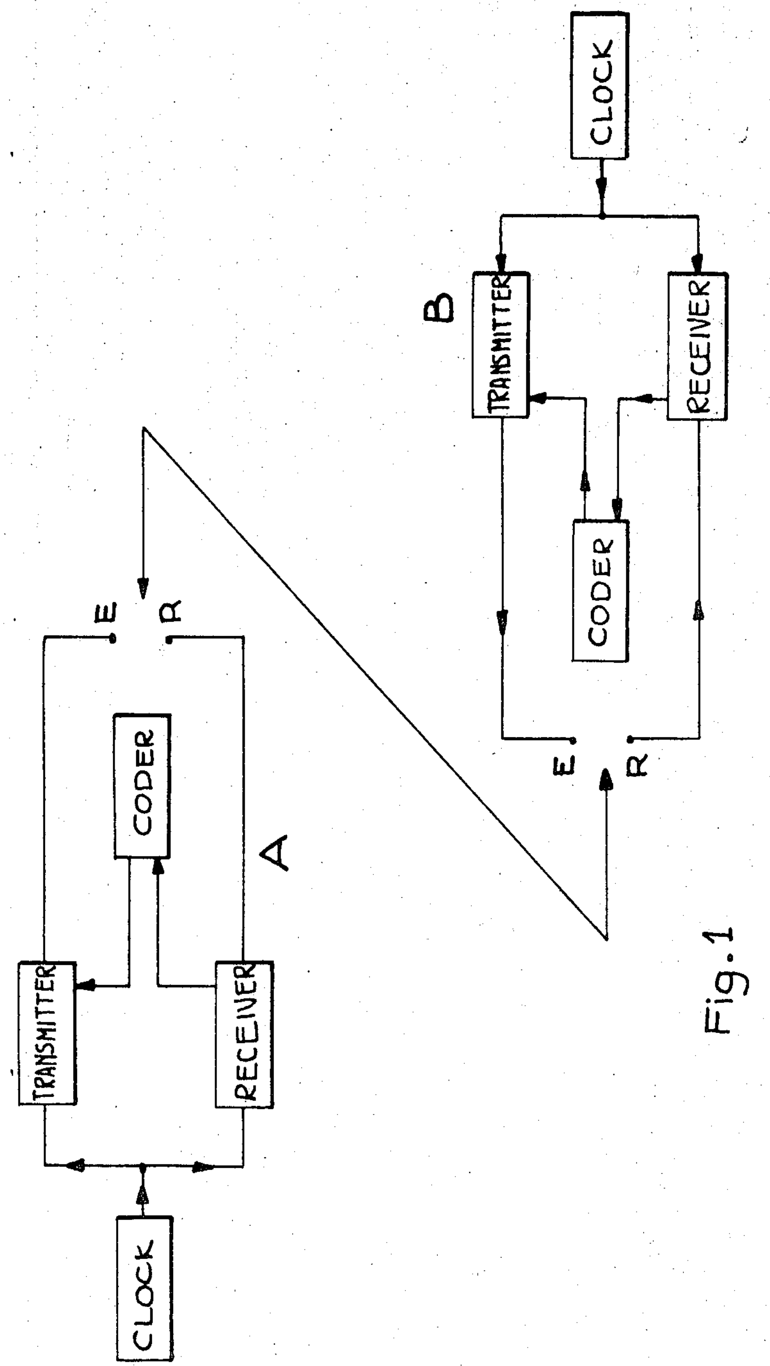
FIG. 1 is a block diagram of a coded synchronous two-way link according to the invention.

In the example shown in FIG. 1, two stations A and B operate in a two-way arrangement.

Each station comprises a transmitter EM, a receiver REC and a switch E–R for switching the latter of the former to an antena, not shown. A coding and decoding device CHT ensures during the reception the decoding of the received message and during the transmission the coding of the transmitted message.

A clock HOR controls sequentially the operation of the assembly, which will be explained in greater detail hereinafter.

In the following, the coding and decoding device will be assumed to comprise a key generator, for example of the type described in the U.S. Pat. No. 3,170,033, for "Electrical Generators of Quasi Random Symbols" Such a key generator comprises a number of counters, controlled by a clock and interconnected by logic circuits. With every step of the clock, it provides at its outputs a group of binary digits forming a key letter K.

The coding device comprises in addition a calculator which receives the clear letter C, the key letter K and forms therefrom by a series of mathematical operations, which are always the same, the coded letter X. It carries out, for example, the operation $X=K+C$ (modluo 32 if each letter comprises 5 binary digits).

Similarly, during the decoding, the key letter K and the coded letter X are applied to the calculator which derives therefrom the clear letter C. In the present example, the calculator must carry out, for the decoding, the operation $X-K=C$.

It is obvious that, for a coded link between the first station A and the station B to operate in an adequate manner, it is necessary that the two key generators should be synchronized so that the same key letter K corresponds to each pair of letters C and X and that is why the link is called synchronous. In the present instance the problem which the invention proposes to solve is made more complicated by the fact that the station A and the station B operate sometimes as transmitter and sometimes as receiver, i.e. that the link is a two-way link.

In other words, calling $\tau$ the propagation time of the message from A to B, assumed to be the same as the propagation time from B to A, when A operates as a transmitter and B as a receiver, the two clocks have to be phase shifted with respect to each other, with A leading by $\tau$. If B becomes the transmitter and A the receiver, the two clocks must be phase shifted in time by $\tau$, with B in advance of A.

According to the invention, in order to achieve this result, the two stations A and B are caused to operate differently in the course of each communication starting with a call from one of the stations, which will be assumed to be A, to the other. The station B, the so-called slave station, always maintains the same phase (determined by the initial call from A), whether it thereafter functions as a transmitter or as a receiver. The station A, when it starts operating again as a transmitter, is made to lead station B by a phase $\tau$; as soon as it starts operating as a receiver it is made to lag behind station B by $\tau$.

Figure 2:
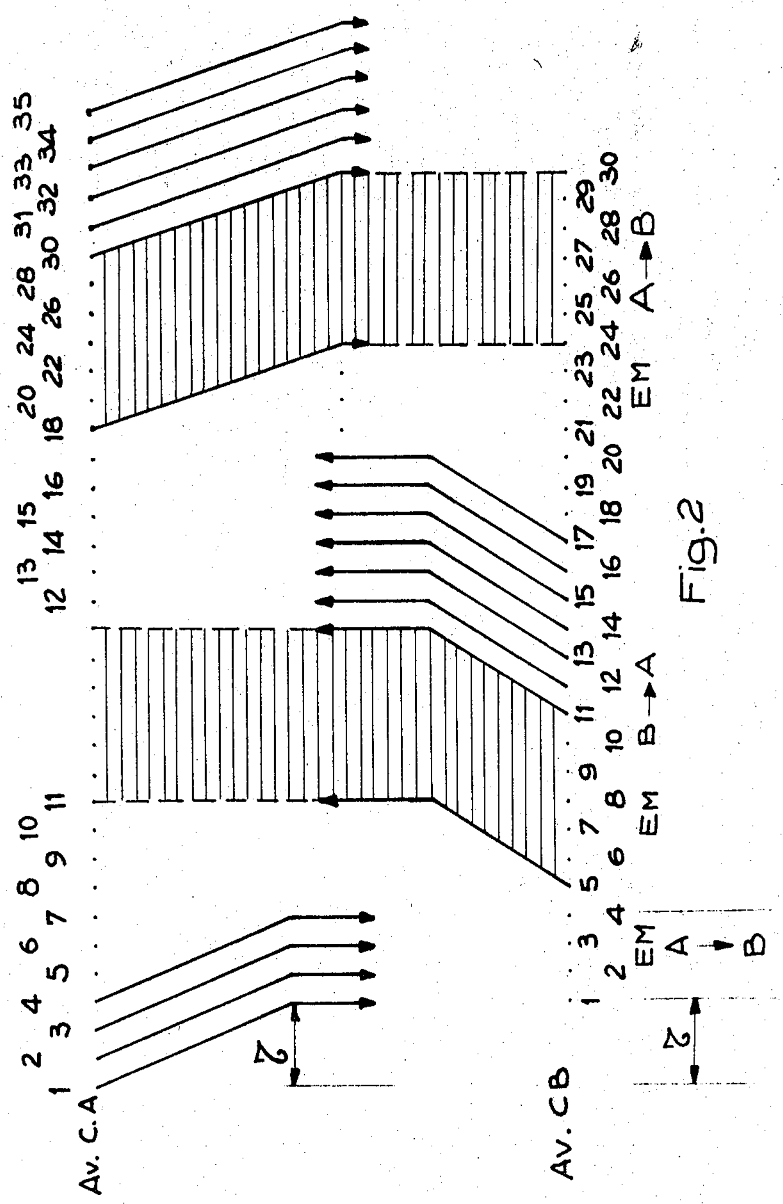
FIG. 2 is an explanatory drawing.

Referring now to FIG. 2, the first line represents, as a function of time, the advances of the key of the station A (Av. C.A.).

Let it first be assumed that the station A is transmitting and that the propagation time $\tau$ corresponds to three steps of the key, whatever the direction of propagation. In other words, the key generator of the station B is delayed by three steps relative to the key generator of the station A, which can be seen by referring to the line Av. C.B. (advance key B). In the example shown, the first transmission time of the station A corresponds to four steps of the key generator. Then the station A switches to reception, and the station B becomes the transmitter after it has received the end of the message from A. The key generator of the station B lags by three steps relative to key generator of the station A. The reception at the station A of the signal coming from the station B is then delayed by $2\times3=6$ steps relative to the state of the key generator of the station A. It is therefore necessary to stop the advance of the key generator of the station A during 6 steps. More precisely, when the station A receives the signal corresponding to the step 5 transmitted by the station B, the key generator of the station A is at step 11. Hence, the advance of the key generator of the station A will be stopped or blocked during a time interval corresponding to six steps, no coded information being transmitted in the meantime from the station B, so that the signal corresponding to the step 12 from the station B may be decoded with the signal corresponding to the step 12 at the station A. The key generator of the station A has remained blocked for 6 periods on the 11th step. During the blocking, no decoding occurs of course.

At a given moment, corresponding, for example, to the step 17 in FIG. 2, the station B will stop transmitting and switches to reception, whilst station A starts transmitting. At this instant, the key generator of the station A is delayed by 3 steps relative to that of the station B, that is to say, the signal corresponding to the step 18 arrives at the station B, when its key generator is at the step $18+3+\tau$. Since the key generator of the station B has a fixed phase, it is necessary to advance the key generator of the station A by the time by which it has previously been delayed, i.e. $3+\tau$, when it switches to transmission, i.e. since $\tau=3$, by 6 steps. To this end, the key generator of the station A must be advanced at a double rate during 6 steps. Thus, whilst the key generator of station B advances normally and carries out 6 steps, the key generator of the station A must advance by $2\times6=12$ steps and will thus be in advance by $6-\tau$ steps relative to station B, i.e., by 3 steps. During this readjustment, at the station A, there occurs no decoding, no coded information being transmitted.

This operation is shown in FIG. 2.

Figure 3:
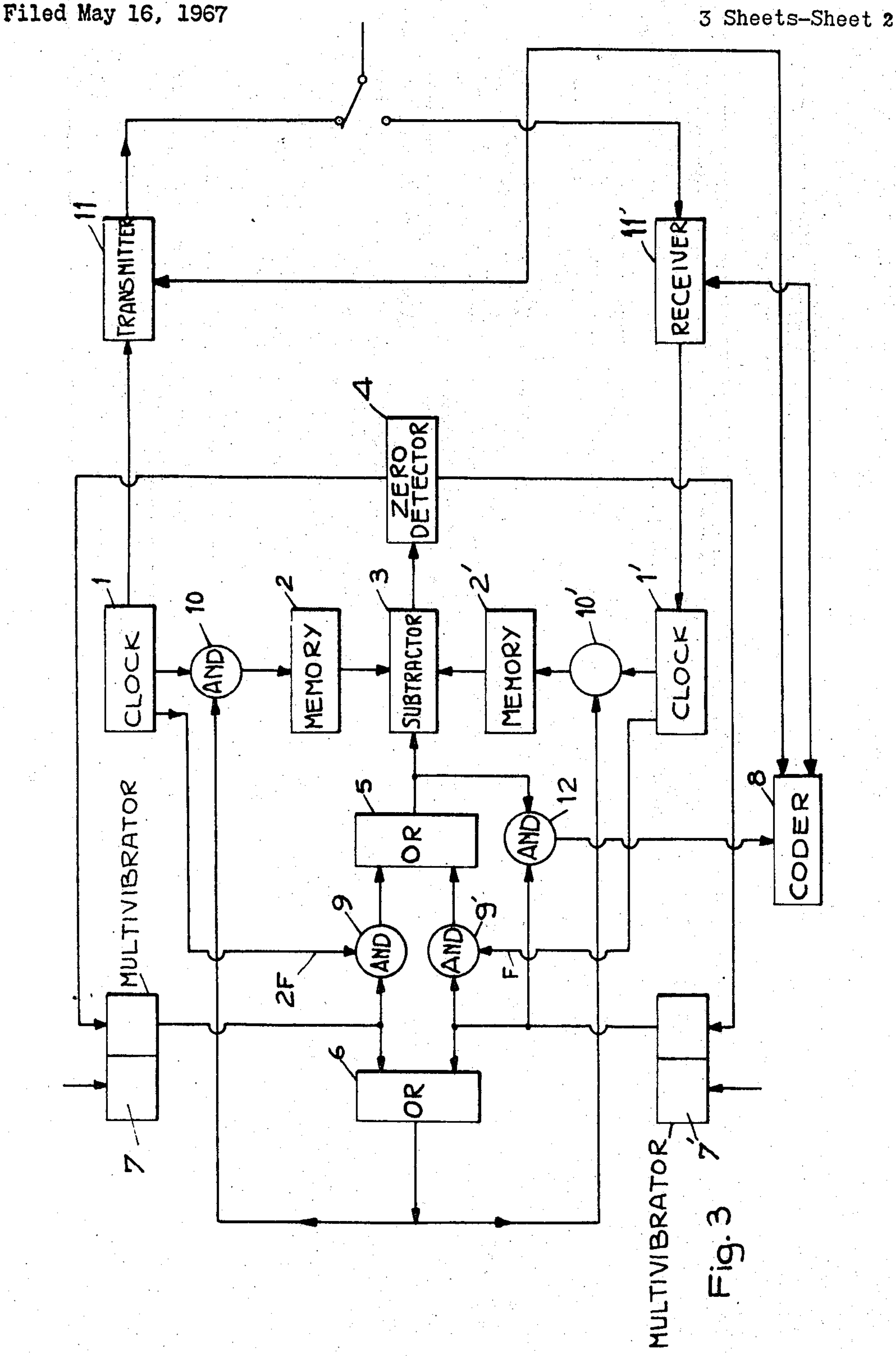
FIG. 3 is a diagram of an embodiment of a transmitting and receiving station according to the invention.

FIG. 3 shows an embodiment of the station A.

The station A comprises a transmission clock 1, controlling the transmitter 11, and a reception clock 1', controlled by the signals received from B through receiver 11' and controlling in turn the receiver 11', the two corresponding connections being shown by a single two-way connection. The same applies for the two connections by means of which the circuits 11'', when the station is receiving, delivers to the device 8 the coded messages and receive therefrom the clear messages, as well as for the two connections by means of which the circuit 11, when the station is transmitting, deliver to the device 8 the clear messages and receive therefrom the coded messages. In addition, a contactor connects the antenna to the arrangement for the transmission or reception according to whether the station transmits or receives. The reception clock 1' has a phase $\varphi'_1$ (number of clock steps counted by the clock counter starting from a step determined by the received signals). The transmission clock 1 has a phase $\varphi_1$ (number of clock steps counted by the clock counter starting from a clock step corresponding to the initial call). One of these two phases, $\varphi_1$, leads relative to the phase of the station B by $\tau$, the other, $\varphi'_1$ lags relative to the same phase by $\tau$.

If $\tau$ varies, the system is such that the phase $\varphi'_1$ is associated with this variation and that the following equation always obtains:

$$[\varphi_1-\varphi'_1]=2\tau$$

A bistable multivibrator 7 detects the passage from reception to transmission of the antenna contactor. This multivibrator is connected on the one hand to a memory 2 through an OR-circuit 6 and an AND-circuit 10 and controls, on the other hand an AND-circuit 9 whose second input receives pulses with the frequency 2F, F being the frequency of the steps of the clock 1 and whose output is connected to the first input of an OR-circuit 5.

The second input of the AND-circuit 10 is connected to the clock 1. The operation of the multivibrator 7 causes the opening of the AND-gate 10 and transfers to the memory 2 the phase $\varphi_1$ of the clock 1.

Similarly, the second input of the OR-circuit 6 is connected to the multivibrator 7' which detects the passage from transmission to reception. An AND-gate 9' is controlled by the multivibrator 7' and receives from clock 1' at its second input pulses with the frequency F. The output of this gate 9' is connected to the second input of the OR-circuit 5.

The output of the OR-circuit 6 controls in the same way through the AND-circuit 10' the connection of the clock 1' to the memory 2', which stores the phase $\varphi'_1$ of the clock 1'.

Thus, with every detection by the multivibrators 7 and 7' of a passage from transmission to reception or vice versa, the circuits 10 and 10' enable the transfer of the phase $\varphi_1$ and $\varphi'_1$ of the clocks 1 and 1' into the memories 2 and 2'.

These two memories are connected to two inputs of a subtracting and back counting circuit 3 which records the difference $\varphi_1-\varphi'_1$ expressed in terms of clock steps, i.e. of key generator steps. This circuit 3 receives the output signals of the OR-circuit 5, each pulse of which decreases this difference by one unit. Its output is connected to a zero detector 4. When the same records a zero value, it sends a signal to the inputs of the multivibrators 7 and 7' for resetting the same to zero.

The computor 8 is connected to the output of the AND-circuit 12, whose inputs are respectively connected to the outputs of the multivibrator 7 and of the OR-circuit 5.

The operation of the assembly is as follows:

The multivibrator 7 detects the switching from reception to transmission by passing from the state 0 to the state 1.

This has the effect, through the OR-circuit 6 and the AND-circuits 10 and 10', of respectively storing into the memories 2 and 2' the phase $\varphi_1$ of the clock 1 and $\varphi'_1$ of the clock 1'. The subtractor 3 connected to the memories 2 and 2' makes the difference $\varphi_1-\varphi'_1$.

On the other hand, the AND-gate 9 is open and the signals with the frequency 2F, coming from the clock 1 are sent through the OR-circuit 5 to the subtractor 3 and to the AND-circuit 12.

The AND-circuit 12, whose second input is connected to the multivibrator 7' is active when 7' is at zero. The output of this AND-circuit, connected to the coder and decoder 8, sends the advance orders to the key generator thereof in such a way that in this case it advances at a speed 2F during the same time as the circuit 3 subtracts its input pulses from the difference $\varphi_1-\varphi'_1$. When the circuit 3 passes to zero, the zero detector 4 sends a control signal for resetting at zero the multivibrator 7, no signal passes from the OR-circuit 5, the timing has again been restored and the key generator advances again normally, i.e. at the frequency F by means of the control pulses received from the circuit 11.

The switching from transmission to reception is detected by the multivibrator 7'. It passes to the state 1 which, through the OR-circuit 6 and the AND-gates 10 and 10' stores the phases $\varphi_1$ and $\varphi'_1$ of the clocks 1 and 1', the subtractor of circuit 3 records $\varphi_1-\varphi'_1$. The signals with the frequency F, coming from the clock 1' are applied by the OR-circuit 5 to the circuit 3. The AND-circuit 12 blocks, under the action of the multivibrator 7', the coder and decoder 8 until this action ceases, when the back counting part of circuit 3 is reset at zero. The coder and decoder is free and starts again to operate normally by means of the control pulses received from the circuits 11'. The two operations provided in FIG. 2, namely the accelerated operation of the key generator during the switching to transmission to compensate for the delay by $2\tau$ and the stopping during the switching to reception in order to take up this delay are thus ensured in a simple manner by the device of FIG. 3.

Of course, the invention is not limited to the embodiment described and shown which were given solely by way of example.

What is claimed is:

1. A transmitter and receiver station for a two-way synchronous coded link comprising: transmitting circuits; receiving circuits; a coding and decoding arrangement, coupled to said transmitting and receiving circuits, for coding the messages transmitted by said station and for decoding the messages received by said station, said arrangement including a key generator for delivering at each step thereof a group of pseudo-random digits; a first clock for causing said key generator to advance one step at regular time intervals of predetermined duration when said station is transmitting information; a second clock for causing said key generator to advance one step at regular time intervals of said predetermined duration when said station is receiving information; said clocks having respective first and second phases expressed in terms of key generator steps; and synchronizing means for momentarily blocking the advance of said key generator to bring it in phase with said second clock when said station switches from transmission to reception, and for momentarily causing said key generator to advance one step at regular time intervals having a duration shorter than said predetermined duration to bring it in phase with said first clock when said station switches from reception to transmission.

2. A transmitter and receiver station as claimed in claim 1, wherein said synchronizing means comprises: means for registering the difference between said first and second phases when said station switches from transmission to reception or vice versa; means for decreasing said registered difference by one unit, respectively at time intervals with a duration shorter than said predetermined duration and at time intervals with said predetermined duration according to whether said switching is from reception to transmission or from transmission to reception, until said difference has been decreased to zero; means for causing said key generator to advance one step at time intervals with said shorter duration while said difference is being erased, when the switching is from reception to transmission; and means for blocking the advance of said key generator while said difference is being erased, when the switching is from transmission to reception.

3. A transmitter and receiver station as claimed in claim 1, said station comprising: an aerial; means for alternately coupling said aerial to said transmitting and to said receiving circuits; said first and second clocks having respective outputs respectively coupled to said transmitting and receiving circuits, respective first auxiliary outputs for respectively delivering pulses at time intervals having a duration equal to half said predetermined duration and at time intervals of said predetermined duration, and respective second auxiliary outputs for delivering signals representative of said first and second phases; said synchronizing means comprising a first and a second AND-gate having respective first inputs respectively coupled to said second auxiliary outputs of said first and second clock, respective second inputs and respective outputs; a first and a second storage device having respective inputs respectively coupled to said outputs of said first and second AND-gates, and respective outputs; a subtracting and back counting circuit having a first, a second and third input, and an output for delivering thereat a signal representative of the difference between the numbers expressed by the signals respectively applied to its first and second inputs, decreased by the number of pulses having been applied to its third input, said first and second inputs of said subtracting and back counting circuit being respectively coupled to said outputs of said first and second storage devices; a first and a second multivibrator coupled to said switching means, and respective outputs; a first OR-gate having two inputs respectively coupled to said outputs of said first and second multivibrators and an output coupled to said second inputs of said first and second AND-gates; and a third and a fourth AND-gate having respective first inputs respectively coupled to said first auxiliary outputs of said first and second clock, respective second inputs respectively coupled to the outputs of said first and second multivibrators, and respective outputs; a second OR-circuit having two inputs respectively coupled to said outputs of said third and fourth AND-gates and an output connected to said third input of said subtracting and back counting circuit; a fifth AND-gate having a first input coupled to the output of said second OR-circuit, a second input coupled to said output of said second multivibrator and an output coupled to said key generator; a detector having an input coupled to the output of said subtracting and back counting circuit for delivering a signal upon receiving signals representative of zero, and an output coupled to said two multivibrators.

References Cited

UNITED STATES PATENTS

| | | | |
|---|---|---|---|
| 3,255,900 | 6/1966 | Graham | 343—7.5 |
| 3,350,644 | 10/1967 | McNair | 325—58 |

RICHARD MURRAY, Primary Examiner

B. V. SAFOUREK, Assistant Examiner

U.S. Cl. X.R.

178—69.5; 325—32, 65